(12) United States Patent
Jin et al.

(10) Patent No.: US 12,547,565 B2
(45) Date of Patent: Feb. 10, 2026

(54) SEMI-POLLING INPUT/OUTPUT COMPLETION MODE FOR NON-VOLATILE MEMORY EXPRESS COMPLETION QUEUE

(71) Applicant: Microsoft Technology Licensing, LLC, Redmond, WA (US)

(72) Inventors: Ming Jin, Shanghai (CN); Vadim Makhervaks, Bellevue, WA (US); Ji Dai, Shanghai (CN); Tengda Yan, Shanghai (CN); Yuan Yi, Shanghai (CN); Chuanjun Yin, Shanghai (CN); Scott Chao-Chueh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/592,026

(22) Filed: Feb. 29, 2024

(65) Prior Publication Data

US 2025/0156353 A1 May 15, 2025

Related U.S. Application Data

(60) Provisional application No. 63/598,438, filed on Nov. 13, 2023.

(51) Int. Cl.
*G06F 13/26* (2006.01)
*G06F 13/22* (2006.01)

(52) U.S. Cl.
CPC .......... *G06F 13/26* (2013.01); *G06F 13/225* (2013.01)

(58) Field of Classification Search
CPC ......... G06F 13/22; G06F 13/225; G06F 13/26
See application file for complete search history.

(56) References Cited

U.S. PATENT DOCUMENTS

| | | |
|---|---|---|
| 10,831,684 B1 | 11/2020 | Kamran |
| 11,086,524 B1 | 8/2021 | Sun |
| 11,886,427 B1 | 1/2024 | Shveidel |
| 12,117,938 B1 | 10/2024 | Derzhavetz |
| 12,182,421 B1 | 12/2024 | Vankamamidi |
| 12,204,457 B1 | 1/2025 | Vankamamidi |
| 12,271,625 B1 | 4/2025 | Astolfi |

(Continued)

OTHER PUBLICATIONS

"Notification Port Example", Retrieved From: https://learn.microsoft.com/en-us/previous-versions/windows/desktop/mscs/notification-port-example, May 31, 2018, 4 Pages.

(Continued)

*Primary Examiner* — Phong H Dang
(74) *Attorney, Agent, or Firm* — Workman Nydegger (57) ABSTRACT

A system and method for using a semi-polling model to monitor a Non-Volatile Memory Express (NVMe) completion queue (CQ). The method, implemented at an interrupt thread, includes receiving an input/output (I/O) request from an application and submitting a submission queue (SQ) entry into an NVMe SQ in response to the I/O request. The method further includes registering for notifications from a polling thread after submitting the SQ entry and receiving, from the polling thread, a notification of the presence of a CQ entry within an NVMe CQ. Additionally, the method involves removing the CQ entry from the NVMe CQ and notifying the application of completion of the I/O request.

14 Claims, 9 Drawing Sheets

(56) References Cited

U.S. PATENT DOCUMENTS

| | | | |
|---|---|---|---|
| 2009/0138625 | A1 | 5/2009 | Lee et al. |
| 2012/0124294 | A1 | 5/2012 | Atkisson et al. |
| 2012/0278511 | A1 | 11/2012 | Alatorre |
| 2016/0092118 | A1 | 3/2016 | Kumar |
| 2016/0306580 | A1 | 10/2016 | Pinto |
| 2017/0052723 | A1 | 2/2017 | Voigt |
| 2017/0308298 | A1 | 10/2017 | Vyshetsky |
| 2018/0150397 | A1 | 5/2018 | Gupta |
| 2018/0316760 | A1 | 11/2018 | Chernin |
| 2019/0317906 | A1* | 10/2019 | Adavi .................. G06F 9/546 |
| 2020/0034475 | A1 | 1/2020 | Venkatesan |
| 2020/0097419 | A1* | 3/2020 | Xing ................... G06F 9/545 |
| 2020/0379925 | A1 | 12/2020 | Andrus |
| 2020/0409583 | A1 | 12/2020 | Kusters |
| 2021/0117333 | A1* | 4/2021 | Qureshi .............. G06F 3/0658 |
| 2021/0216459 | A1 | 7/2021 | Benhanokh |
| 2022/0019362 | A1* | 1/2022 | Badiger ............... G06F 12/10 |
| 2023/0013913 | A1* | 1/2023 | Zinger ................ G06F 9/4881 |
| 2023/0195751 | A1 | 6/2023 | Sun |
| 2023/0333777 | A1 | 10/2023 | Shveidel |
| 2023/0342087 | A1 | 10/2023 | He |
| 2024/0106754 | A1* | 3/2024 | Meng .................. G06N 3/0442 |
| 2024/0232020 | A1 | 7/2024 | Shveidel |
| 2024/0256190 | A1 | 8/2024 | Shveidel |
| 2025/0103490 | A1 | 3/2025 | Seibel |
| 2025/0156104 | A1 | 5/2025 | Wang |
| 2025/0156322 | A1 | 5/2025 | Tong |
| 2025/0156333 | A1 | 5/2025 | Wang |
| 2025/0156360 | A1 | 5/2025 | Jin |
| 2025/0159043 | A1 | 5/2025 | Tong |

OTHER PUBLICATIONS

"Receiving Cluster Events", Retrieved From: https://learn.microsoft.com/en-us/previous-versions/windows/desktop/mscs/receiving-cluster-events, May 31, 2018, 1 Page.

Notice of Allowance mailed on Apr. 8, 2025, in U.S. Appl. No. 18/594,982, 09 pages.

Notice of Allowance mailed on Mar. 26, 2025, in U.S. Appl. No. 18/595,061, 09 pages.

Gugnani, et al., "Arcadia: A Fast and Reliable Persistent Memory Replicated Log", arXiv:2206.12495v1, Jun. 24, 2022, pp. 1-14.

International Search Report and Written Opinion received for PCT Application No. PCT/US2024/051682, Feb. 11, 2025, 14 pages.

International Search Report and Written Opinion received for PCT Application No. PCT/US2024/052172, Jan. 29, 2025, 14 Pages.

Lee, et al., "X-SSD: A Storage System with Native Support for Database Logging and Replication", IEEE, Computer Society Press, Jun. 12, 2022, pp. 988-1002.

Ruan, et al., "Persistent Memory Disaggregation for Cloud-Native Relational Databases", International conference on Automotive User Interfaces and Interactive Vehicular Applications, Mar. 25, 2023, pp. 498-512.

Yang, et al., "Orion: A Distributed File System for Non-Volatile Main Memories and RDMA-Capable Networks", Feb. 26, 2019, pp. 221-234.

Non-Final Office Action mailed on Aug. 8, 2025, in U.S. Appl. No. 18/592,046, 16 pages.

Notice of Allowance mailed on Aug. 12, 2025, in U.S. Appl. No. 18/594,982, 10 pages.

Notice of Allowance mailed on Jun. 18, 2025, in U.S. Appl. No. 18/595,061, 08 pages.

Notice of Allowance mailed on Jun. 23, 2025, in U.S. Appl. No. 18/594,982, 10 pages.

Non-Final Office Action mailed on Aug. 27, 2025, in U.S. Appl. No. 18/587,247, 12 pages.

Notice of Allowability mailed on Sep. 2, 2025, in U.S. Appl. No. 18/595,061, 05 pages.

Notice of Allowance mailed on Aug. 22, 2025, in U.S. Appl. No. 18/595,061, 08 pages.

Notice of Allowance mailed on Sep. 16, 2025, in U.S. Appl. No. 18/594,982, 10 pages.

U.S. Appl. No. 63/598,420, filed Nov. 13, 2023.
U.S. Appl. No. 63/598,426, filed Nov. 13, 2023.
U.S. Appl. No. 63/598,429, filed Nov. 13, 2023.
U.S. Appl. No. 63/598,438, filed Nov. 13, 2023.
U.S. Appl. No. 18/594,982, filed Mar. 4, 2024.
U.S. Appl. No. 18/595,061, filed Mar. 4, 2024.
U.S. Appl. No. 18/587,247, filed Feb. 26, 2024.
U.S. Appl. No. 18/587,258, filed Feb. 26, 2024.
U.S. Appl. No. 18/592,046, filed Feb. 29, 2024.
U.S. Appl. No. 19/385,793, filed Nov. 11, 2025.

Notice of Allowance mailed on Dec. 9, 2025, in U.S. Appl. No. 18/592,046, 07 pages.

* cited by examiner

SEMI-POLLING INPUT/OUTPUT COMPLETION MODE FOR NON-VOLATILE MEMORY EXPRESS COMPLETION QUEUE

CROSS-REFERENCE TO RELATED APPLICATIONS

This application claims priority to, and the benefit of, U.S. Provisional Application Ser. No. 63/598,438, filed Nov. 13, 2023, and entitled "SEMI-POLLING INPUT/OUTPUT COMPLETION MODE FOR NON-VOLATILE MEMORY EXPRESS COMPLETION QUEUE," the entire contents of which are incorporated by reference herein in their entirety.

BACKGROUND

Cloud computing has revolutionized the way data is stored and accessed, providing scalable, flexible, and cost-effective solutions for businesses and individuals alike. A core component of these systems is the concept of virtualization, which allows for the creation of virtual machines (VMs) or containers that can utilize resources abstracted from the physical hardware. VMs and containers utilize storage resources, typically in the form of virtual disks. Oftentimes, virtual disks are not tied to any specific physical storage device, but rather, they are abstracted representations of storage space that can be dynamically allocated and adjusted based on the requirements of each VM or container. This abstraction allows for greater flexibility and scalability, as storage resources can be allocated and adjusted dynamically based on the requirements of the VM or container.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including, at an interrupt thread: receiving an input/output (I/O) request from an application; submitting a submission queue (SQ) entry into a Non-Volatile Memory Express (NVMe) SQ in response to the I/O request; registering for notifications from a polling thread after submitting the SQ entry; receiving, from the polling thread, a notification of a presence of a completion queue (CQ) entry within an NVMe CQ; removing the CQ entry from the NVMe CQ; and notifying the application of completion of the I/O request.

In some aspects, the techniques described herein relate to methods, systems, and computer program products, including, at an interrupt thread: receiving an I/O request from an application; submitting an SQ entry into an NVMe SQ in response to the I/O request; registering, from a polling thread, for notifications after submitting the SQ entry, including registering for a software interrupt from the polling thread; receiving, from the polling thread, a notification of a presence of a CQ entry within an NVMe CQ, including receiving the software interrupt from the polling thread; removing the CQ entry from the NVMe CQ; and notifying the application of completion of the I/O request.

In some aspects, the techniques described herein relate to methods, systems, and computer program products, including, at an interrupt thread: receiving an I/O request from an application; submitting an SQ entry into an NVMe SQ in response to the I/O request; registering for notifications from a polling thread after submitting the SQ entry, causing the polling thread to peek at an NVMe CQ for a CQ entry, identify that the CQ entry is present within the NVMe CQ, and send, to the interrupt thread, a notification of a presence of the CQ entry within the NVMe CQ; receiving, from the polling thread, the notification of the presence of the CQ entry within the NVMe CQ; removing the CQ entry from the NVMe CQ; and notifying the application of completion of the I/O request.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

The performance of cloud environments is closely tied to the performance of storage Input/Output (I/O) operations within those environments. For example, the performance of a virtual machine (VM) or container can be impacted greatly by the performance of storage I/O operations used by the VM or container to access (e.g., read from or write to) a virtual disk. Some embodiments described herein are operable within the context of a host cache (e.g., a cache service operating at a VM/container host) that improves the performance of I/O operations of a hosted VM or container for accessing a virtual disk.

In some embodiments, a host cache utilizes persistent memory (PMem) and Non-Volatile Memory Express (NVMe) technologies to improve storage I/O performance within a cloud environment. PMem refers to non-volatile memory technologies (e.g., INTEL OPTANE, SAMSUNG Z-NAND) that retain stored contents through power cycles. This contrasts with conventional volatile memory technologies such as dynamic random-access memory (DRAM) that lose stored contents through power cycles. Some PMem technology is available as non-volatile media that fits in a computer's standard memory slot (e.g., Dual Inline Memory Module, or DIMM, memory slot) and is thus addressable as random-access memory (RAM).

NVMe refers to a type of non-volatile block storage technology that uses the Peripheral Component Interconnect Express (PCIe) bus and is designed to leverage the capabilities of high-speed storage devices like solid-state drives (SSDs), providing faster data transfer rates compared to traditional storage interfaces (e.g., Serial AT Attachment (SATA)). NVMe devices are particularly beneficial in data-intensive applications due to their low latency I/O and high I/O throughput compared to SATA devices. NVMe devices can also support multiple I/O queues, which further enhance their performance capabilities.

Currently, PMem devices have slower I/O access times than DRAM, but they provide higher I/O throughput than SSD and NVMe. Compared to DRAM, PMem modules come in much larger capacities and are less expensive per gigabyte (GB), but they are more expensive per GB than NVMe. Thus, PMem is often positioned as lower-capacity "top-tier" high-performance non-volatile storage that can be backed in a "lower-tier" by larger-capacity NVMe drives, SSDs, and the like. As a result, PMem is sometimes referred to as "storage-class memory."

The NVMe specification defines an interface between a host computer (e.g., an NVMe driver executing at the host computer) and an NVMe controller. This interface is based on the use of queue pairs, each comprising a submission queue (SQ) and a completion queue (CQ), that are shared between an NVMe driver and an NVMe controller. SQs and CQs are ring buffers with fixed slot sizes that are allocated from host memory accessible to the NVMe controller (e.g., via direct memory access (DMA)). The first entry of each queue is indicated by a head value, and the last entry of each queue is indicated by a tail value. Multiple SQs can utilize a single CQ, though there can be multiple CQ's available. One SQ/CQ pairing is used as an administrative queue (e.g., for non-I/O operations such as to set up SQs and CQs), while additional SQ/CQ pairings are used as data queues (e.g., on I/O data paths).

To issue commands to an NVMe controller, an NVMe driver places one or more SQ entries (e.g., each specifying a command) into an SQ. The NVMe driver then signals the NVMe controller about the presence of those entries by writing a value to a "doorbell" register, at the NVMe controller, that is associated with that SQ. Writing a value to an SQ doorbell register is often referred to as "ringing" an SQ doorbell. The value written indicates a new tail slot (e.g., last entry) of the SQ, for example, based on a number of SQ entries that were placed by the NVMe driver onto the SQ. Based on the value written to the doorbell register, the NVMe controller reads one or more SQ entries from the SQ and completes each corresponding command indicated by the SQ entries (e.g., in the order received, in a priority order).

When the NVMe controller completes a given command, it inserts a corresponding CQ entry into a CQ that is paired with the SQ through which the command was submitted. The NVMe driver then obtains a given command's completion state from a CQ entry on the CQ and uses that completion state to complete the command (e.g., return success, return failure). When the NVMe driver has finished processing a given CQ entry, it writes to the CQ's doorbell register, signaling to the NVMe controller that this CQ slot can be re-used for future completions.

NVMe devices are conventionally interacted with fully in kernel mode by a kernel mode NVMe driver or fully in user mode using a user mode NVMe driver—for example, using technologies such as Storage Performance Development Kit (SPDK). In contrast, at least some embodiments herein provide user mode direct access to NVMe device I/O-path queue pairs (e.g., SQs and CQs) that are managed by an operating system (OS) kernel. Thus, the embodiments described herein provide for secure kernel mode management of an NVMe device's queue pairs, while permitting user mode access to certain I/O-path queue pairs. These embodiments include a kernel mode NVMe driver and an application programming interface (API) library for use by a user mode application. The kernel mode driver creates and manages regular queue pairs and reserved queue pairs. The regular queue pairs exist within kernel space memory and are used for conventional I/O APIs (e.g., by a kernel mode filesystem driver). On the other hand, the reserved queue pairs are exposed to user space memory and are used for user mode I/O. This arrangement enables user mode applications to get direct data access to an NVMe device (e.g., via the reserved queue pairs), which reduces latency and provides for higher I/O operations per second (e.g., through reduced context switches to kernel mode) without dedicating the NVMe device exclusively to user mode access. This means that conventional file APIs and filesystems managed by the OS kernel also work.

In embodiments, a host cache improves the performance of storage I/O operations of VMs and/or containers to their virtual disks by utilizing NVMe protocols. For example, some embodiments use a virtual (e.g., emulated) NVMe controller to expose virtual disks to VMs and/or containers, enabling those VMs/containers to utilize NVMe queues, buffers, control registers, etc., directly. Additionally, or alternatively, a host cache improves the performance of storage I/O operations of VMs and/or containers to their virtual disks by leveraging PMem as high-performance non-volatile storage for caching reads and/or writes.

In these embodiments, a host caching service environment integrates the foregoing embodiments for providing user mode direct access to NVMe device I/O-path queue pairs that are managed by an OS kernel. For example, a host caching service, a virtual NVMe controller, etc., gain access to NVMe device I/O-path queue pairs, which reduces latency and provides for higher I/O operations per second for a host caching service. However, these embodiments are applicable beyond a host caching service.

When interacting with NVMe queues, it is necessary for software (e.g., kernel, driver, application) to occasionally poll some queues for the presence of an entry placed into the queue by the NVMe device. This disclosure describes different polling models, including "full-polling" and "semi-polling." Full-polling utilizes a non-blocking thread to poll a queue, requiring a dedicated processor core. Semi-polling, on the other hand, uses both a blocking thread and a non-blocking thread. This arrangement provides the flexibility to use the blocking thread for "non-critical" I/O paths (e.g., administrative operations) where some latency is tolerable while using the non-blocking thread for "critical" I/O paths (e.g., data operations). Offloading work from the non-blocking thread to the blocking thread reduces CPU utilization by the blocking thread, which in turn reduces I/O latency.

Figure 1:
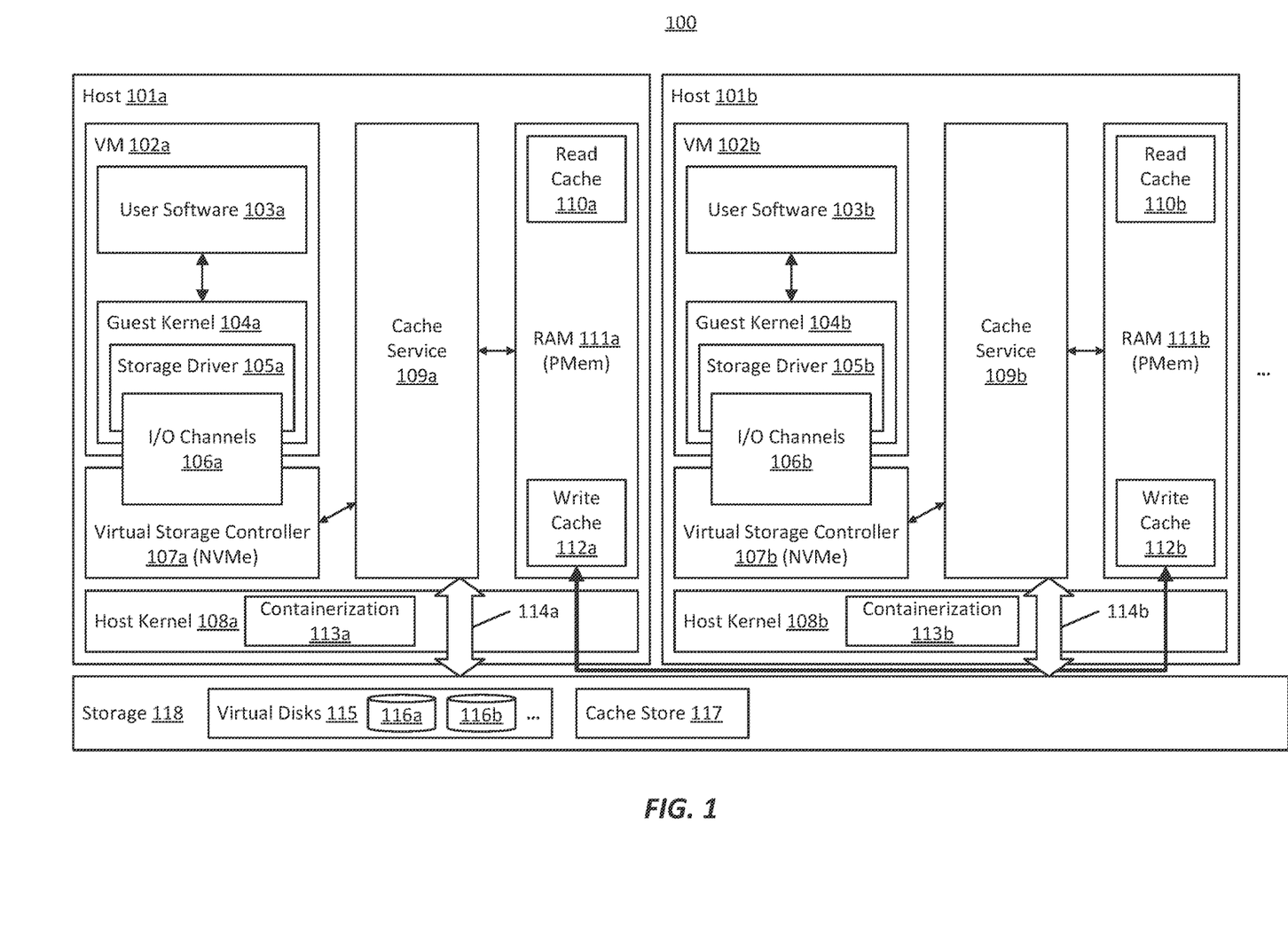
FIG. 1 illustrates an example of a computer architecture that includes a host cache service operating within a cloud environment.

FIG. 1 illustrates an example of a host cache service operating within a cloud environment 100. In FIG. 1, cloud environment 100 includes hosts (e.g., host 101a, host 101b; collectively, hosts 101). An ellipsis to the right of host 101b indicates that hosts 101 can include any number of hosts (e.g., one or more hosts). In embodiments, each host is a VM host and/or a container host. Cloud environment 100 also includes storage 118 (e.g., one or more storage devices) storing, e.g., virtual disks 115 (e.g., virtual disk 116a, virtual disk 116b) for use by VMs/containers operating at hosts 101, de-staged cache data (e.g., cache store 117), etc.

In the example of FIG. 1, each host of hosts 101 includes a corresponding host OS including a corresponding host kernel (e.g., host kernel 108a, host kernel 108b) that each includes (or interoperates with) a containerization component (e.g., containerization component 113a, containerization component 113b) that supports the creation of one or more VMs and/or one or more containers at the host. Examples of containerization components include a hypervisor (or elements of a hypervisor stack) and a containerization engine (e.g., AZURE container services, DOCKER, LINUX Containers). In FIG. 1, each host of hosts 101 includes a VM (e.g., VM 102a, VM 102b). VM 102a and VM 102b are each shown as including a guest kernel (e.g., guest kernel 104a, guest kernel 104b) and user software (e.g., user software 103a, user software 103b).

In FIG. 1, each host includes a host cache service (e.g., cache service 109a, cache service 109b). In embodiments, a storage driver (e.g., storage driver 105a, storage driver 105b) at each VM/container interacts, via one or more I/O channels (e.g., I/O channels 106a, I/O channels 106b) with a virtual storage controller (e.g., virtual storage controller 107a, virtual storage controller 107b) for its I/O operations, such as I/O operations for accessing virtual disks 115. In embodiments, each host cache service communicates with a virtual storage controller to cache these I/O operations. As one example, in FIG. 1, the virtual storage controllers are shown as being virtual NVMe controllers. In this example, the I/O channels comprise NVMe queues (e.g., administrative queues, submission queues, completion queues), buffers, control registers, and the like.

In embodiments, each host cache service at least temporarily caches reads (e.g., read cache 110a, read cache 110b) and/or writes (e.g., write cache 112a, write cache 112b) in memory (e.g., RAM 111a, RAM 111b). As shown, in some embodiments, memory includes non-volatile PMem. For example, a read cache stores data that has been read (and/or that is predicted to be read) by VMs from storage 118 (e.g., virtual disks 115), which can improve read I/O performance for those VMs (e.g., by serving reads from the read cache if that data is read more than once). A write cache, on the other hand, stores data that has been written by VMs to virtual disks 115 prior to persisting that data to storage 118. Write caching allows for faster write operations, as the data can be written to the write cache quickly and then be written to storage 118 at a later time, such as when storage 118 is less busy.

In embodiments, and as indicated by arrows 114a and 114b, each host cache service may persist (e.g., de-stage) cached writes from memory to storage 118 (e.g., to virtual disks 115 and/or to cache store 117). In addition, an arrow that connects write cache 112a and write cache 112b indicates that, in some embodiments, the host cache service replicates cached writes from one host to another (e.g., from host 101a to host 101b, or vice versa).

Figure 2:
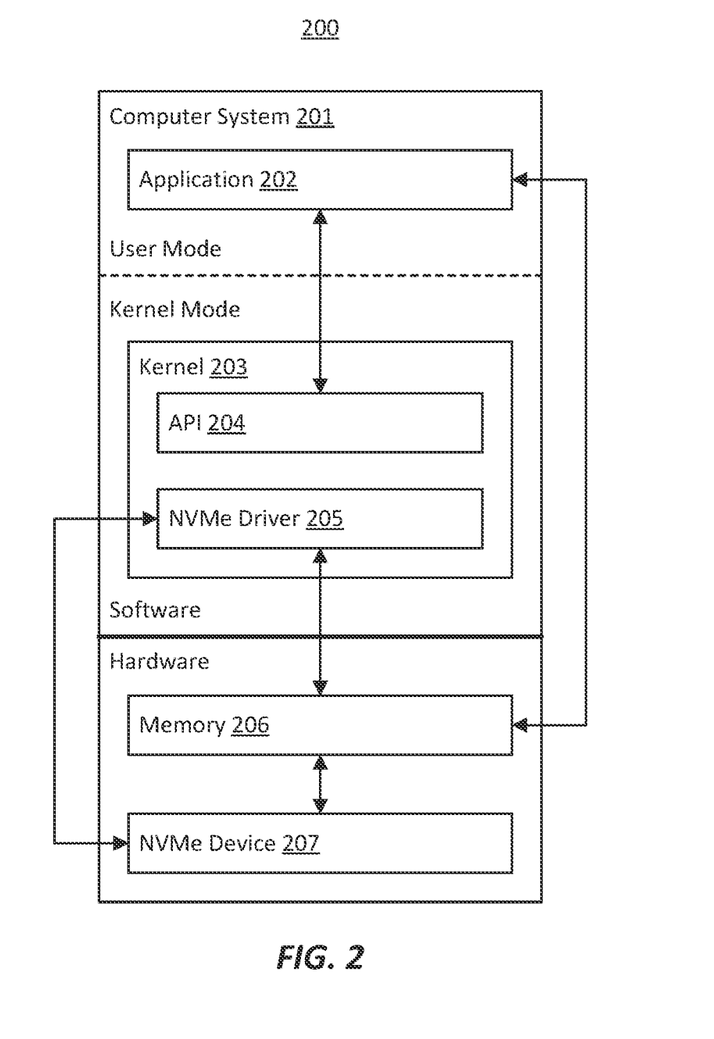
FIG. 2 illustrates an example of a computer system that provides user mode components with direct access to Non-Volatile Memory Express (NVMe) device input/output-path queue pairs.

As mentioned, some embodiments provide user mode components with direct access to NVMe device I/O-path queue pairs (e.g., SQ/CQ parings) that are managed by an OS kernel, thereby providing for secure kernel mode management of an NVMe device's queue pairs, while permitting user mode access to certain I/O-path queue pairs via user space memory. FIG. 2 illustrates an example 200 of a computer system 201, such as host 101a, host 101b, etc. In example 200, computer system 201 includes hardware such as a processor system (not shown), a memory 206, and an NVMe device 207. Computer system 201 also executes software such as kernel 203 (e.g., as part of an OS) and application 202. As shown, kernel 203 executes in a kernel mode context, while application 202 executes in a user mode context. Referring to FIG. 1 and host 101a, in an example, kernel 203 corresponds to host kernel 108a, and application 202 corresponds to virtual storage controller 107a, cache service 109a, or VM 102a (or even combinations thereof). In example 200, kernel 203 includes an NVMe driver 205, which interacts with NVMe device 207 directly (e.g., to set doorbell registers) or via memory 206 (e.g., memory corresponding to queue pairs). Thus, kernel 203 has direct access to NVMe device 207 as is conventional for NVMe drivers.

As shown in example 200, application 202 interacts with NVMe driver 205 via an API 204 provided by kernel 203. In embodiments, application 202 interacts with an NVMe driver 205 using API 204 to set up NVMe queue pairs within memory 206 accessible by application 202 (e.g., user space memory). In some embodiments, application 202 interacts with an NVMe driver 205 using API 204 to modify doorbell registers at NVMe device 207. Thus, concurrent with direct access to NVMe device 207 by kernel 203, application 202 also has access to NVMe device 207 (e.g., via memory 206, via API 204). Example 200, therefore, illustrates an environment that provides application 202 in user mode direct access to NVMe device I/O-path queue pairs (e.g., SQs and CQs) that are managed by kernel 203, thereby providing for secure kernel mode management of queue pairs for NVMe device 207, while permitting user mode access to certain I/O-path queue pairs.

Figure 3A:
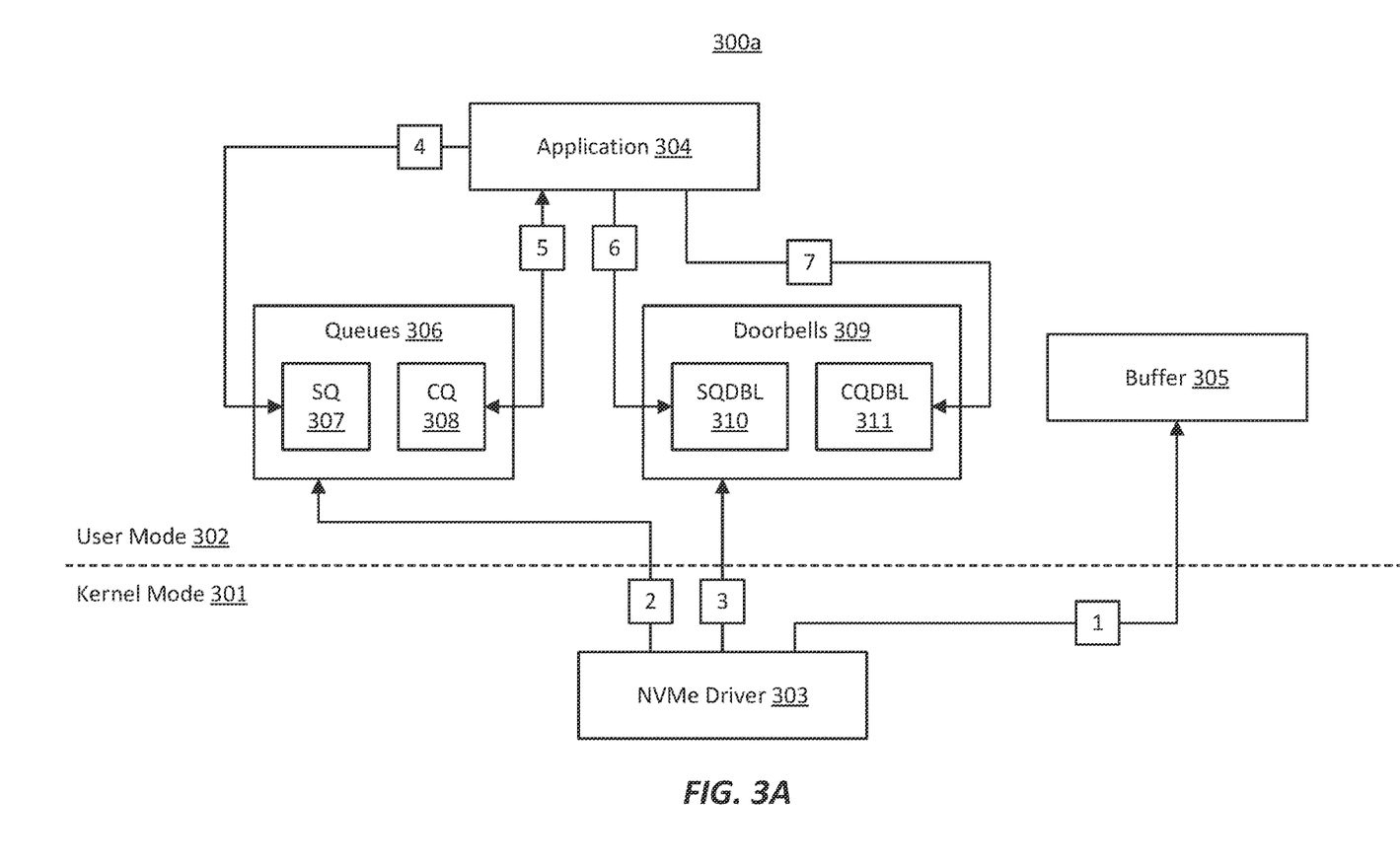
FIGS. 3A-3B illustrate examples of a kernel mode NVMe driver sharing NVMe device access with a user mode application.
Figure 3B:
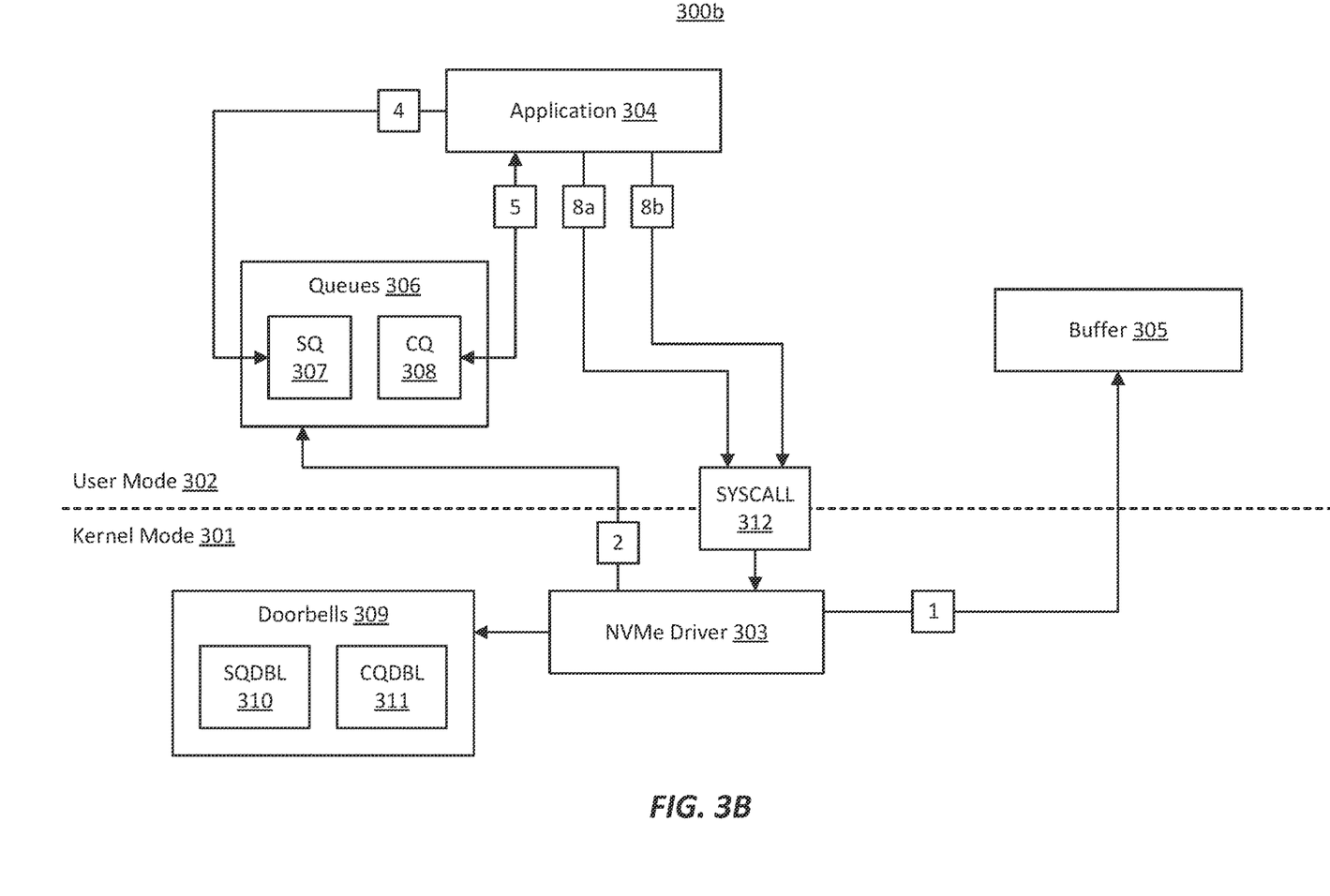

FIGS. 3A and 3B illustrate example 300a and example 300b of a kernel mode NVMe driver sharing NVMe device access with a user mode application. In each of example 300a and example 300b, an NVMe driver 303 (e.g., NVMe driver 205) executes in kernel mode 301 in a computer system, and an application 304 (e.g., application 202) executes in user mode 302 in the computer system. Using an API (e.g., API 204), application 304 negotiates NVMe resources—such as a memory buffer, one or more queue pairs, and/or doorbells—that the NVMe driver 303 makes accessible to user mode 302.

In reference to example 300a and example 300b, an arrow labeled 1 indicates that application 304 obtains (e.g., via a system call into NVMe driver 303) a user mode mapping to a memory buffer 305 that application 304 uses to communicate data with an NVMe device (e.g., via DMA). For example, application 304 obtains, via a system call into NVMe driver 303, a user mode memory address that NVMe driver 303 has mapped to memory buffer 305, a size of memory buffer 305, and the like. An arrow labeled 2 indicates that application 304 also obtains (e.g., via a system call into NVMe driver 303) user mode mappings to a reserved queue pair (e.g., SQ 307 and CQ 308 in queues 306) for communicating commands directly to the NVMe device. For example, application 304 obtains, via a system call into NVMe driver 303, a user mode memory address that NVMe driver 303 has mapped to SQ 307, a user mode memory address that NVMe driver 303 has mapped to SQ 308, a size of each queue, and the like.

In reference to example 300a, an arrow labeled 3 indicates that, in one embodiment, application 304 also obtains (e.g., a system call into NVMe driver 303) user mode mappings (e.g., memory addresses) to NVMe hardware doorbell registers—illustrated as SQ doorbell (SQDBL 310) and CQ doorbell (CQDBL 311) in doorbells 309—that enable application 304 to ring doorbells at the NVMe device directly. Alternatively, in reference to example 300b, in another embodiment, NVMe driver 303 exposes an API that includes a system call (SYSCALL 312), through which application 304 requests that NVMe driver 303 interact with doorbells 309 on its behalf. Notably, the embodiment of example 300a has the benefit of achieving lower I/O latency than the embodiment of example 300b, e.g., because application 304 can ring doorbells 309 without any transitions between kernel mode 301 and user mode 302 transitions. However, example 300a may sacrifice some control by NVMe driver 303 because application 304 is enabled to directly modify the state of the NVMe device (e.g., hardware doorbell register values). In contrast, the embodiment of example 300b has the benefit of maintaining control of the NVMe device by NVMe driver 303, which may improve security and/or stability, with the drawback of requiring any kernel transition between kernel mode 301 and user mode 302 for application 304 to ring a doorbell at the NVMe device.

In reference to example 300a and example 300b, an arrow labeled 4 indicates that application 304 submits an I/O command via direct access to SQ 307. After submitting the I/O command, application 304 rings SQDBL 310 directly (e.g., an arrow labeled 6, example 300a), or uses SYSCALL 312 to request that NVMe driver 303 ring SQDBL 310 (e.g., an arrow labeled 8a, example 300b). In embodiments, after ringing SQDBL 310, application 304 continues executing while waiting for the I/O command to complete. An arrow labeled 5 indicates that, during this execution, application 304 occasionally polls CQ 308 to determine when the submitted command has been completed. Depending on the command being sent to SQ 307, application 304 may use memory buffer 305 to send data to the NVMe device or read data from the NVMe device.

After identifying a CQ entry, application 304 may ring CQDBL 311 directly (e.g., an arrow labeled 7, example 300a) or use SYSCALL 312 to request that NVMe driver 303 ring CQDBL 311 (e.g., an arrow labeled 8b, example 300b). In some embodiments, SYSCALL 312 rings both SQDBL 310 and CQDBL 311 in a single call (e.g., the arrow labeled 8a), reducing the number of system calls needed in the embodiment of example 300b.

In some embodiments, NVMe driver 303 partitions an NVMe device between multiple user mode components (e.g., multiple applications, multiple VMs, and/or multiple containers) by allocating a unique set of logical block addresses (LBAs) to each user mode component. In embodiments, as part of processing SYSCALL 312 to ring a doorbell, NVMe driver 303 validates that the user mode component is performing legal operations before ringing a hardware doorbell (e.g., by verifying the items in the SQ, such as to ensure that a given user mode component only interacts with its allocated set of LBAs, to ensure that a given user mode component is interacting with an LBA that is present in the underlying storage, and the like).

As mentioned, in example 300a and example 300b, application 304 occasionally polls CQ 308 to determine when the submitted command has been completed (e.g., the arrow labeled 5). In some embodiments, application 304 uses "full-polling" on one or more CQs. Full-polling means that application 304 uses a non-blocking polling thread to poll CQ 308, which requires a dedicated processor core.

Figure 4:
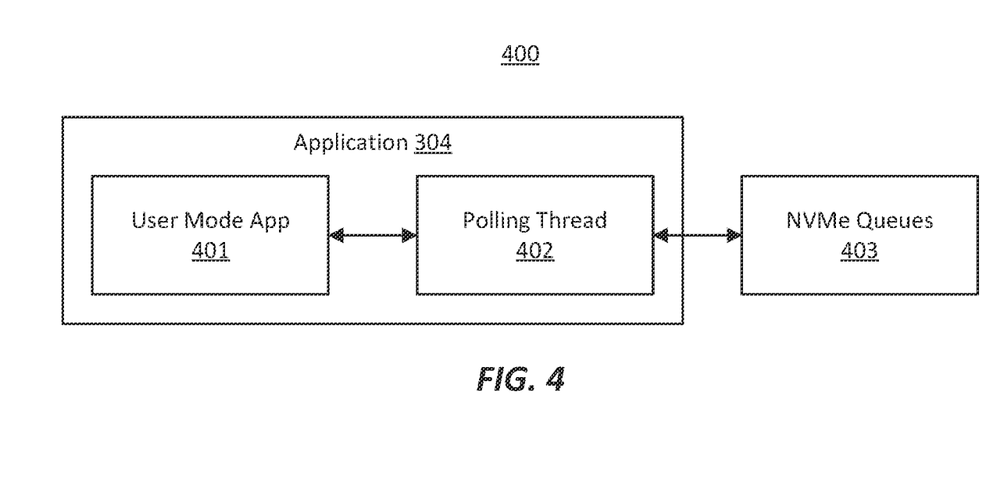
FIG. 4 illustrates an example of an application configured for full-polling on an NVMe completion queue (CQ).

FIG. 4 illustrates an example 400 in which application 304 of example 300a and example 300b is configured to use full-polling on one or more CQs. In example 400, application 304 includes a user mode application 401 (e.g., virtual storage controller 107a, cache service 109a, VM 102a) and a polling thread 402. As shown, user mode application 401 uses polling thread 402 to interact with NVMe queues 403 (e.g., queues 306).

Figure 5:
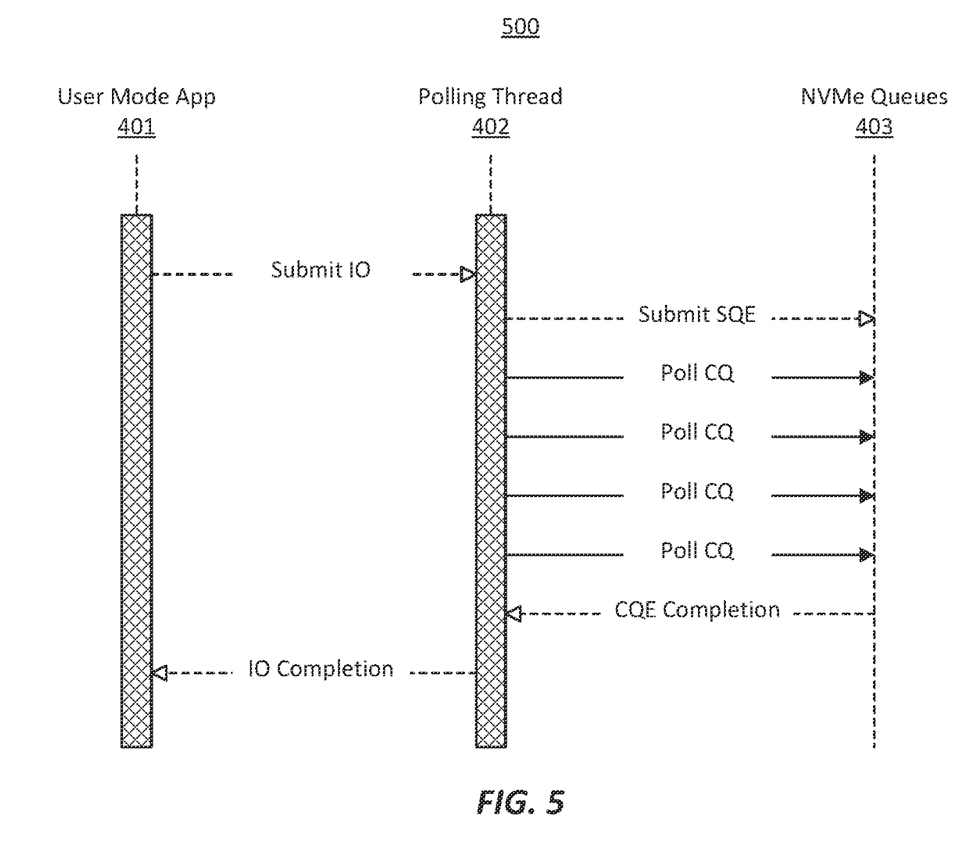
FIG. 5 illustrates an example of full-polling on an NVMe CQ.

FIG. 5 illustrates an example 500 of user mode application 401 of example 400 using polling thread 402 to interact with NVMe queues 403, including using full-polling on a CQ (e.g., CQ 308). In example 500, user mode application 401 submits an I/O request to polling thread 402. In response to user mode application 401 submitting the I/O request, polling thread 402 submits an SQ entry to NVMe queues 403 (e.g., SQ 307). In some embodiments, polling thread 402 rings a doorbell (e.g., SQDBL 310). In other embodiments, user mode application 401 rings the doorbell.

After submitting the SQ entry to NVMe queues 403, polling thread 402 periodically polls NVMe queues 403 (e.g., CQ 308). Based on this polling, polling thread 402 identifies a CQ entry placed by an NVMe device. After identifying the CQ entry, polling thread 402 completes the I/O operation (e.g., by removing the CQ entry from the CQ, by ringing a CQ doorbell) and signals user mode application 401 of the I/O completion.

As indicated by cross-hatched boxes in FIG. 5, in embodiments, polling thread 402 runs continuously, meaning it is a non-blocking thread that has no context switches. In embodiments, a full-polling model is used for "critical" I/O paths (e.g., data I/O operations) because using a non-blocking thread reduces I/O latency compared to using a blocking thread. However, because polling thread 402 is non-blocking, polling thread 402 requires the use of a dedicated processor core.

Additionally, or alternatively, in embodiments, application 304 uses "semi-polling" on one or more CQs. Unlike pull-polling, which uses only a non-blocking polling thread, semi-polling uses a blocking interrupt thread, together with a non-blocking polling thread. This arrangement provides the flexibility to use a blocking thread for "non-critical" I/O paths (e.g., administrative operations) where some latency is tolerable while using a non-blocking thread for "critical" I/O paths (e.g., data operations). Offloading work from the non-blocking thread to the blocking thread reduces CPU utilization by the blocking thread, which in turn reduces I/O latency. Semi-polling is now described in detail in connection with FIGS. 6-8.

Figure 6:
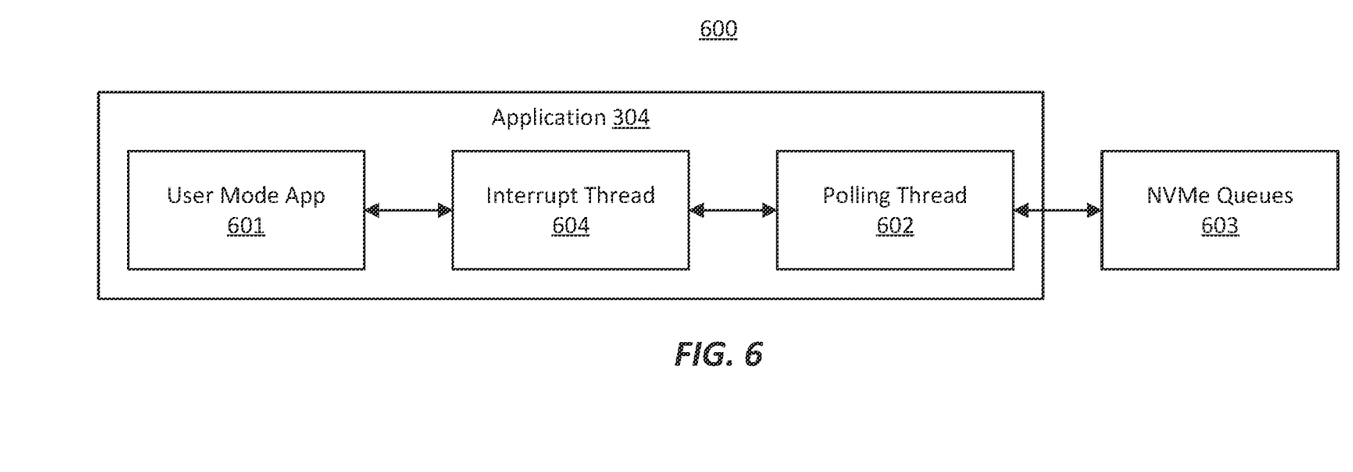
FIG. 6 illustrates an example of an application configured for semi-polling on an NVMe CQ.

FIG. 6 illustrates example 600 in which application 304 of example 300a and example 300b is configured to use semi-polling on one or more CQs. In example 600, application 304 includes a user mode application 601 (e.g., virtual storage controller 107a, cache service 109a, VM 102a), an interrupt thread 604, and a polling thread 602. As shown, user mode application 601 uses interrupt thread 604 for interacting with NVMe queues 603. Interrupt thread 604, in turn, utilizes polling thread 602 to interact with NVMe queues 603.

In embodiments, interrupt thread 604 is configured to block, while polling thread 602 is non-blocking. Notably, because interrupt thread 604 operates in user mode, interrupt thread 604 may be unable to get hardware interrupts an NVMe device (e.g., to receive a notification of the presence of a CQ entry). Thus, in embodiments, the interrupt thread operates by registering to receive a software interrupt.

Figure 7:
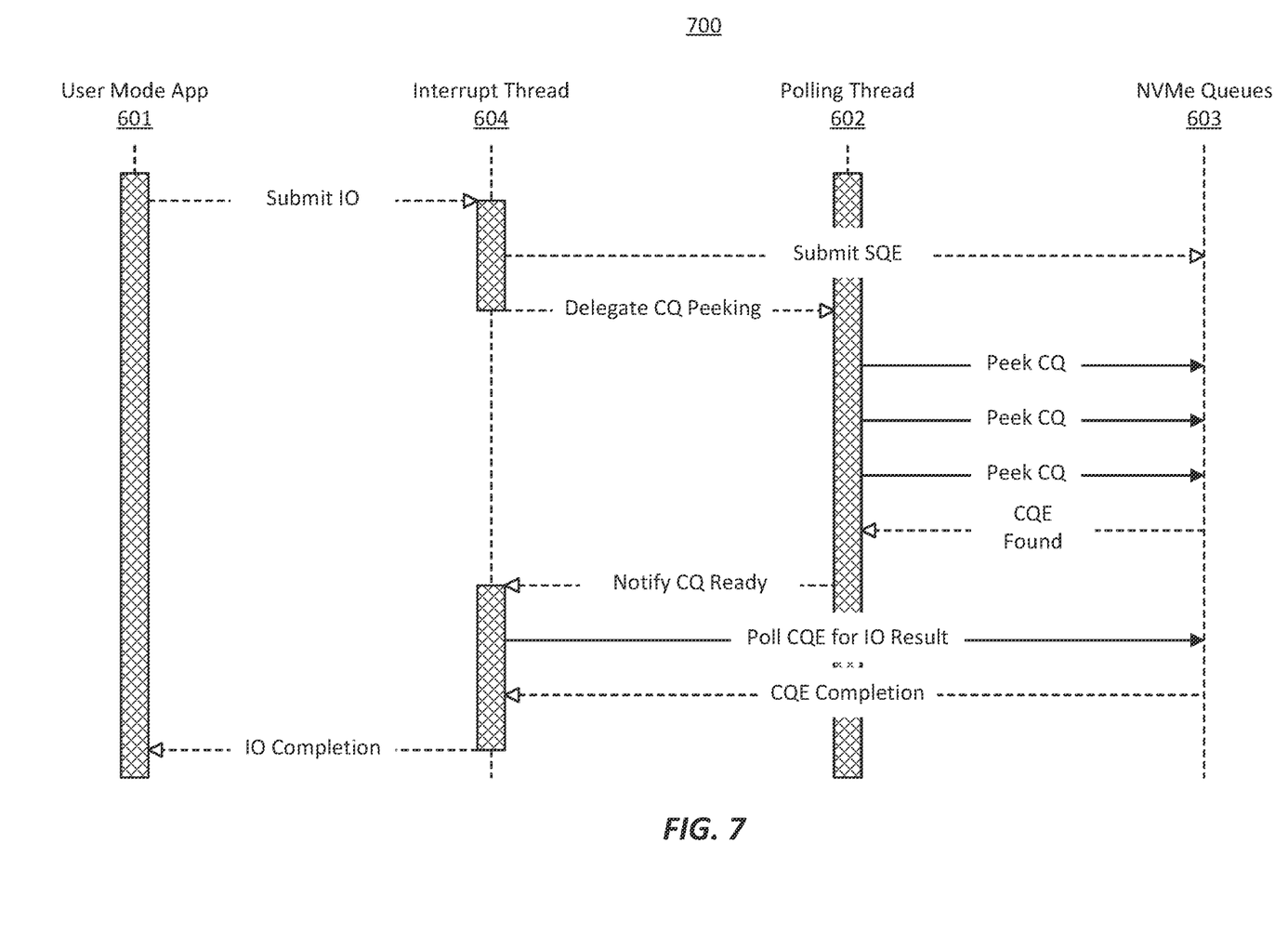
FIG. 7 illustrates an example of semi-polling on an NVMe CQ.

FIG. 7 illustrates example 700 of user mode application 601 of example 600 using interrupt thread 604 for interacting with NVMe queues 403 using a semi-polling model. In example 700, user mode application 601 submits an I/O request to interrupt thread 604. In response to this I/O request, interrupt thread 604 wakes (if it was sleeping) and submits an SQ entry to NVMe queues 603 (e.g., SQ 307). In some embodiments, interrupt thread 604 rings a doorbell (e.g., SQDBL 310). In other embodiments, user mode application 601 rings the doorbell. Interrupt thread 604 then delegates the task of monitoring the CQ to polling thread 602 (i.e., delegate CQ peeking) by registering itself to receive a software interrupt from polling thread 602 and then sleeps.

While polling thread 402 polled NVMe queues 403 in example 600, in example 700 polling thread 602 checks the CQ for the presence of a CQ entry placed there by the NVMe device, without completing the I/O operation. Thus, polling thread 602 does not remove the CQ entry from the CQ or ring a CQ doorbell. In this description, and in the claims, the term "peek" refers to checking a queue for the presence of an entry, without removing that entry from the queue. When a CQ entry is found, polling thread 602 notifies interrupt thread 604 that a CQ entry is available. Interrupt thread 604 then wakes (if needed), completes the I/O operation (e.g., by removing the CQ entry from the CQ, by ringing a CQ doorbell), and signals user mode application 601 of the I/O completion.

In embodiments, a semi-polling model is used for "non-critical" I/O paths (e.g., administrative operations) where some latency is tolerable. In some embodiments, the semi-polling and full-polling models are combined. For example, user mode application 601 corresponds to user mode application 401, polling thread 602 corresponds to polling thread 402, and NVMe queues 603 corresponds to NVMe queues 403. In embodiments, interrupt thread 604 is used for "non-critical" I/O paths, while polling thread 602 is used for "critical" I/O paths. In embodiments, the use of interrupt thread 604 for "non-critical" I/O paths reduces the workload of polling thread 602. Thus, the semi-polling model has reduced CPU usage by the non-blocking polling thread when compared to a full-polling model, which can reduce overall I/O latency.

Embodiments are now described in connection with FIG. 8, which illustrates a flow chart of an example method 800 for using a semi-polling model to monitor an NVMe CQ. In embodiments, instructions for implementing method 800 are encoded as computer-executable instructions (e.g., interrupt thread 604, polling thread 602) stored on a computer storage media that are executable by a processor to cause a computer system (e.g., computer system 201) to perform method 800.

The following discussion now refers to a number of methods and method acts. Although the method acts are discussed in specific orders or are illustrated in a flow chart as occurring in a particular order, no order is required unless expressly stated or required because an act is dependent on another act being completed prior to the act being performed.

In embodiments, method 800 operates within an environment, such as the one described in connection with example 700, that includes an interrupt thread (e.g., interrupt thread 604), a polling thread (e.g., polling thread 602), and an application (e.g., user mode application 601). In embodiments, the interrupt thread, the polling thread, and the application all operate in user mode.

Figure 8:
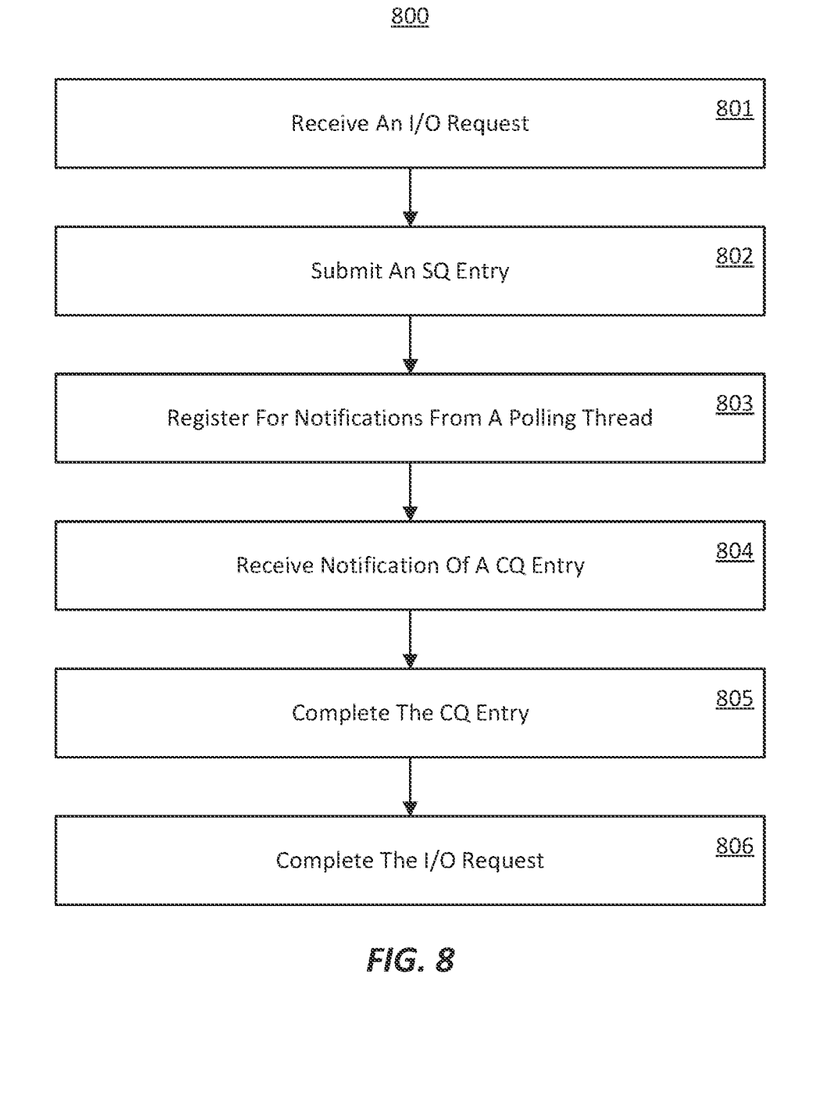
FIG. 8 illustrates a flow chart of an example of a method for using a semi-polling model to monitor an NVMe CQ.

Referring to FIG. 8, in embodiments, method 800 comprises act 801 of receiving an I/O request. In some embodiments, act 801 comprises receiving an I/O request from an application. For example, referring to FIG. 7, interrupt thread 604 receives an I/O request (e.g., "Submit 10") from user mode application 601.

Method 800 also comprises act 802 of submitting an SQ entry. In some embodiments, act 802 comprises submitting an SQ entry into an NVMe SQ in response to the I/O request. For example, referring to FIG. 7, interrupt thread 604 submits a SQ entry (e.g., "Submit SQE") to NVMe queues 603.

In embodiments, after submitting an SQ entry, interrupt thread 604 rings an SQ doorbell at an NVME device, by writing a value to a corresponding doorbell register. As such, in embodiments, method 800 further includes ringing an SQ doorbell after submitting the SQ entry to the NVMe SQ.

Method 800 also comprises act 803 of registering for notifications from a polling thread. In some embodiments, act 803 comprises registering for notifications from a polling thread after submitting the SQ entry. For example, referring to FIG. 7, interrupt thread 604 delegates CQ peeking to polling thread 602.

In some embodiments, delegating CQ peeking to polling thread 602 comprises registering for a software interrupt from polling thread 602. As such, in embodiments, registering for the notification from the polling thread includes registering for a software interrupt from the polling thread.

In some embodiments, after registering for notifications from the polling thread, interrupt thread 604 sleeps. As such, in embodiments, method 800 further includes sleeping after registering for the notification from the polling thread.

As described in connection with example 700, after interrupt thread 604 has delegated CQ peeking to polling thread 602 polling thread 602 periodically peeks an NVMe CQ for the presence of a CQ entry. Thus, in embodiments, after the interrupt thread has registered for the notifications from the polling thread, method 800 further includes the polling thread peeking at the NVMe CQ for the CQ entry. Based on periodically peeking at the NVMe CQ, polling thread 602 eventually identifies the presence of a CQ entry. As such, in embodiments, based on peeking at the NVMe CQ for the CQ entry, method 800 further includes the polling thread identifying that the CQ entry is present within the NVMe CQ. Based on polling thread 602 having identified the presence of a CQ entry, polling thread 602 notifies interrupt thread 604. Thus, in embodiments, based on identifying that the CQ entry is present within the NVMe CQ, method 800 further includes the polling thread notifying the interrupt thread of the presence of the CQ entry within the NVMe CQ.

As a result of polling thread 602 notifying interrupt thread 604, method 800 also comprises act 804 of receiving notification of a CQ entry. In some embodiments, act 804 comprises receiving a notification of the presence of a CQ entry within an NVMe CQ from the polling thread. For example, based on polling thread 602 peeking NVMe queues 603, polling thread 602 identifies the presence of a CQ entry and notifies interrupt thread 604 (e.g., via software interrupt).

As discussed in connection with act 803, in embodiments delegating CQ peeking to polling thread 602 comprises interrupt thread 604 registering for a software interrupt from polling thread 602. Thus, in embodiments of method 800, the interrupt thread receiving the notification of the presence of the CQ entry within the NVMe CQ includes the interrupt thread receiving a software interrupt from the polling thread.

In embodiments, the notification of a CQ entry wakes interrupt thread 604. As such, in embodiments, method 800 further includes waking after receiving the notification of the presence of the CQ entry within the NVMe CQ.

Method 800 also comprises act 805 of completing the CQ entry. In some embodiments, act 805 comprises removing the CQ entry from the NVMe CQ. For example, interrupt thread 604 polls NVMe queues 603 for a CQ entry result, removes the CQ entry result, rings a CQ doorbell, and the like.

Method 800 also comprises act 806 of completing the I/O request. In some embodiments, act 806 comprises notifying the application of completion of the I/O request. For example, interrupt thread 604 notifies user mode application 601 of the completion of the I/O operation. In some embodiments, interrupt thread 604 notifies user mode application 601 of a result of the I/O operation (e.g., based on the CQ entry result).

Embodiments of the disclosure comprise or utilize a special-purpose or general-purpose computer system (e.g., host 101a, host 101b, computer system 201) that includes computer hardware, such as, for example, a processor system and system memory (e.g., RAM 111a, RAM 111b, memory 206), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media. Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more CPUs, one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (SaaS), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more VMs. During operation, VMs emulate an operational computing system, supporting an OS and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes that come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented in a computer system that includes a processor system, comprising:
   receiving, by an interrupt thread, an input/output (I/O) request from an application;
   submitting, by the interrupt thread, a submission queue (SQ) entry into a Non-Volatile Memory Express (NVMe) SQ in response to the I/O request;
   registering, by the interrupt thread, for notifications from a polling thread after submitting the SQ entry;
   responsive to the registering, identifying, by the polling thread, whether an NVMe completion queue (CQ) entry that corresponds to the SQ entry is present within an NVMe CQ without removing the CQ entry from the NVMe CQ;
   receiving, by the interrupt thread, a software interrupt from the polling thread, the software interrupt signaling a presence of a completion queue (CQ) entry within an NVMe CQ;
   removing, by the interrupt thread, the CQ entry from the NVMe CQ in response to receiving the software interrupt; and
   notifying, by the interrupt thread, the application of completion of the I/O request.

2. The method of claim 1, wherein the interrupt thread, the polling thread, and the application operate in user mode.

3. The method of claim 1, wherein the method further comprises ringing an SQ doorbell after submitting the SQ entry to the NVMe SQ.

4. The method of claim 1, wherein the method further comprises sleeping after registering for the notification from the polling thread.

5. The method of claim 1, wherein the method further comprises waking after receiving the notification of the presence of the CQ entry within the NVMe CQ.

6. The method of claim 1, wherein registering for the notification from the polling thread comprises registering for the software interrupt from the polling thread.

7. A computer system comprising:
   a processor system; and
   a computer storage medium that stores computer-executable instructions that are executable by the processor system to at least:
   receive, by an interrupt thread, an input/output (I/O) request from an application;
   submit, by the interrupt thread, a submission queue (SQ) entry into a Non-Volatile Memory Express (NVMe) SQ in response to the I/O request;
   register, by the interrupt thread, for notifications from a polling thread after submitting the SQ entry, including registering for a software interrupt from the polling thread;
   responsive to the registering, identifying, by the polling thread, whether an NVMe completion queue (CQ) entry that corresponds to the SQ entry is present within an NVMe CQ without removing the CQ entry from the NVMe CQ;
   receive, by the interrupt thread, the software interrupt from the polling thread, the software interrupt signaling a presence of a completion queue (CQ) entry within an NVMe CQ, including receiving the software interrupt from the polling thread;
   remove, by the interrupt thread, the CQ entry from the NVMe CQ in response to receiving the software interrupt; and
   notify, by the interrupt thread, the application of completion of the I/O request.

8. The computer system of claim 7, wherein the interrupt thread, the polling thread, and the application operate in user mode.

9. The computer system of claim 7, wherein the computer-executable instructions are also executable by the processor system to ring an SQ doorbell after submitting the SQ entry to the NVMe SQ.

10. The computer system of claim 7, wherein the computer-executable instructions are also executable by the processor system to sleep after registering for the notification from the polling thread.

11. The computer system of claim 7, wherein the computer-executable instructions are also executable by the processor system to wake after receiving the notification of the presence of the CQ entry within the NVMe CQ.

12. A computer-readable hardware storage medium that stores computer-executable instructions that are executable by a processor system to implement at an interrupt thread that is configured to at least:
   receive, by the interrupt thread, an input/output (I/O) request from an application;
   submit, by the interrupt thread, a submission queue (SQ) entry into a Non-Volatile Memory Express (NVMe) SQ in response to the I/O request;
   register, by the interrupt thread, for notifications from a polling thread after submitting the SQ entry;
   responsive to the registering, identify, by the polling thread, whether an NVMe completion queue (CQ) entry that corresponds to the SQ entry is present within an NVMe CQ without removing the CQ entry from the NVMe CQ;

receive, by the interrupt thread, a software interrupt from the polling thread, the software interrupt signaling a presence of the CQ entry within the NVMe CQ;

remove, by the interrupt thread, the CQ entry from the NVMe CQ in response to receiving the software interrupt; and notify, by the interrupt thread, the application of completion of the I/O request.

13. The computer-readable hardware storage medium of claim 12, wherein the computer-executable instructions are also executable by the processor system to ring an SQ doorbell after submitting the SQ entry to the NVMe SQ.

14. The computer-readable hardware storage medium of claim 12, wherein the computer-executable instructions are also executable by the processor system to sleep after registering for the notification from the polling thread.

* * * * *